Oct. 14, 1969    H. J. MANSELL    3,472,524
CHUCK CONSTRUCTION

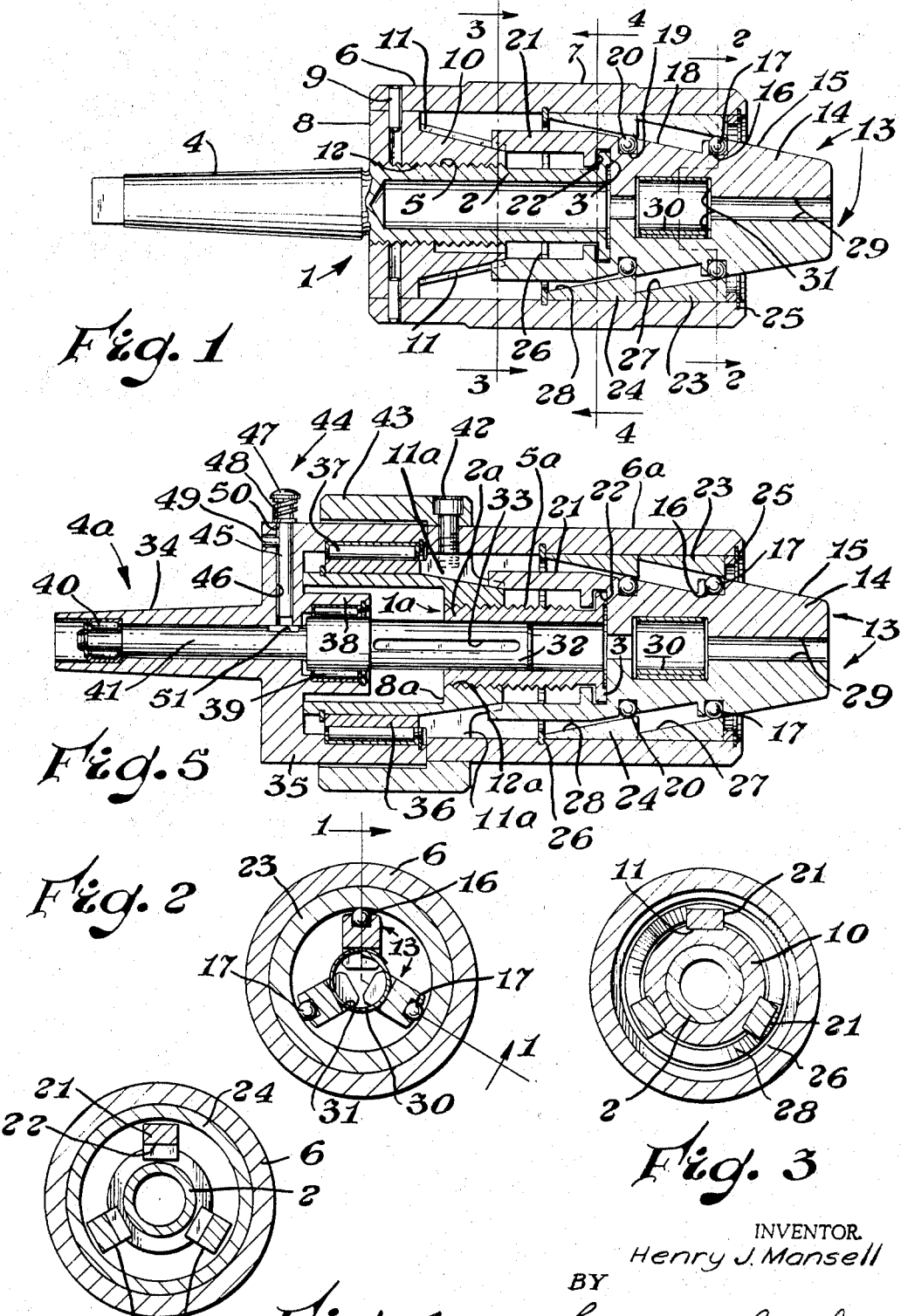

Filed Oct. 11, 1965    2 Sheets-Sheet 2

INVENTOR.
Henry J. Mansell
BY
Learman + McCulloch
ATTORNEYS

United States Patent Office 3,472,524
Patented Oct. 14, 1969

3,472,524
CHUCK CONSTRUCTION
Henry J. Mansell, 225½ Main St.,
Davison, Mich. 48423
Filed Oct. 11, 1965, Ser. No. 494,631
Int. Cl. B23b *31/40, 31/14, 5/22*
U.S. Cl. 279—2                                    5 Claims

ABSTRACT OF THE DISCLOSURE

A chuck of either the internal or external type having a support on which is mounted a body and a plurality of separate and independent jaws that are movable radially into and out of clamping engagement with a workpiece or tool. Axially inclined thrust members act on the jaws via antifriction balls to move the jaws in one radial direction in response to relative axial movement in one direction of the body and the support and a coil spring acts on the jaws to move them in the opposite radial direction in response to relative axial movement in the opposite direction of the body and the support.

---

This invention relates to chuck constructions and more particularly to a chuck provided with individual jaws which may be radially expanded or contracted to engage or release a tool or workpiece.

An object of this invention is to provide a chuck construction utilizing a plurality of separate, independent jaw elements which are radially expansible and contractable over a substantial distance so as to enable the chuck to be capable of accommodating workpieces or tools of greatly differing sizes.

Another object of the invention is to provide a chuck construction of the type referred to which is adaptable for use either as an external or an internal chuck.

A further object of the invention is to provide a chuck construction wherein expansion or contraction of the jaw elements can be effected without reliance upon keys or gearing.

Another object of the invention is to provide a chuck construction of the character described and in which expansion and contraction of the jaw elements may be effected by screw threaded, pneumatic, or hydraulic actuating means.

A further object of the invention is to provide a chuck construction wherein the jaw elements and the jaw actuating means are relatively movable along random paths so as to minimize the risk of indenting or otherwise adversely affecting the movable parts of the apparatus by the repetitive imposition of forces on the same surface portions.

Another object of the invention is to provide a chuck construction which is adaptable for use with either fixed or rotatable supporting means.

A further object of the invention is to provide a chuck construction the parts of which are readily and easily assembled and disassembled.

Other objects and advantages of the invention will be pointed out specifically or will become apparent from the following description when it is considered in conjunction with the appended claims and the accompanying drawings, in which:

FIGURE 1 is a longitudinal sectional view of a contractable chuck constructed in accordance with one embodiment of the invention, the section being taken on the line 1—1 of FIGURE 2;

FIGURE 2 is a transverse sectional view taken on the line 2—2 of FIGURE 1;

FIGURE 3 is a transverse sectional view taken on the line 3—3 of FIGURE 1;

FIGURE 4 is a transverse sectional view taken on the line 4—4 of FIGURE 1;

FIGURE 5 is a view similar to FIGURE 1, but illustrating a modified embodiment of the invention;

Figure 6:
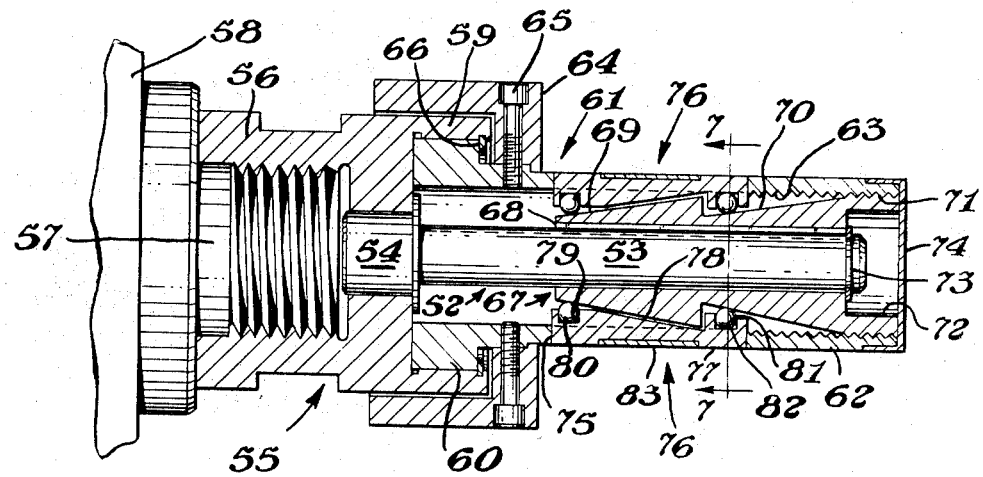
FIGURE 6 is a longitudinal sectional view illustrating an expansible chuck construction, the section being taken on the line 6—6 of FIGURE 7.

The chuck illustrated in FIGURES 1-4 comprises an axially elongated support member 1 having a preferably hollow shank portion 2 which terminates at one end in a radially enlarged flange 3 and at its other end in a tapered stem 4 that is adapted for insertion in the head or tail stock of a lathe or similar machine (not shown). Between its ends, the shank portion 2 is threaded as at 5 in the disclosed embodiment.

Surrounding the support member 1 is an annular, generally cylindrical body member 6 having a radially enlarged, preferably knurled intermediate portion 7. At one end of the body member 6 is a mounting member 8 which is pinned as at 9 or otherwise suitably fixed to the body. The mounting member 8 includes an axially extending, tapered or inclined boss 10 which is provided with three uniformly angularly spaced, axially extending grooves or slots 11. The mounting member is axially bored and threaded as at 12 to correspond to the threads 5.

Accommodated within the body member 6 are three identical, separate jaw elements 13 each of which includes a forward nose portion 14 having an inclined outer surface 15, the inclination of which corresponds to the inclination of the slots 11. At the rear end of each inclined surface 15 is a groove 16 in which is accommodated an antifriction thrust transmitting member or roller 17. Rearwardly of the groove 16 each jaw element is provided with another inclined surface 18 which corresponds to the inclination of the surface 15 and terminates at its rear end in a groove 19 in which a second antifriction roller 20 is accommodated. From the rear of the groove 19 extends a stabilizing arm portion 21, the rear end of which is accommodated in one of the slots 11 of the mounting member 8. Between the groove 19 and the rear end of the stabilizing arm 21 is provided a radially inner groove 22 in which the flange 3 of the support member 1 is accommodated.

Between the jaw elements 13 and the inner surface of the body member 6 is a number of annular thrust members 23 and 24 which abut one another and are capable of rotation relative to the body member 6. The thrust members 23 and 24 are maintained in assembled relation by means of snap rings 25 and 26 which are accommodate in grooves formed in the inner surface of the body member. The inner surface 27 of the thrust member 23 is inclined to correspond to the inclination of the jaw surface 15, and the inner surface 28 of the thrust member 24 is similarly inclined.

Each jaw element 13 is provided with a radially inner surface 29 which is flat and parallels the longitudinal axis of the support member 1. A workpiece or tool (not shown) is adapted to be gripped between the confronting surfaces 29 of the jaws. Means is provided for constantly and yieldably urging the jaw elements 13 radially outwardly and comprises a coiled, flat expansion spring 30 that is accommodated in notches 31 formed in each jaw.

In the operation of the apparatus, the stem 4 may be inserted in the chuck of a lathe or similar machine and the body member 6 rotated on the threaded shank 2 so as to cause the body member 6 to move axially of the support member to the right, as viewed in FIGURE 1. Such movement of the body will cause the members 10, 23 and 24 to move axially relatively to the jaws 13 inasmuch as the jaws are restrained against axial movement by the presence of the flange 3 in the groove 22. Such relative movement of the parts will cause the radially enlarged ends of the tapered surfaces 27 and 28 to be so positioned with respect to the balls 17 and 20 as to enable the jaws 13 to be moved radially outwardly by the spring 30. Radial outward movement of the jaws 13 is assisted by the interengagement of the stabilizing arm portions 21 and the bottoms of the slots 11. The engagement of the arms with the sides of the slots 11 causes rotation of the jaw elements with the body member.

When it is desired to clamp a workpiece or tool in the chuck, the tool or workpiece may be interposed between the clamping surfaces 29 of the jaw elements, and the body 6 rotated in such direction as to cause the latter to move axially from right to left, as viewed in FIGURE 1. Such movement of the body will cause the thrust members 23 and 24 to exert radially inwardly directed forces on the balls 17 and 20 which will transmit such forces to the jaw elements 13 and move the latter radially inwardly into clamping relation with the tool or workpiece. During the clamping of a part between the jaw elements, the engagement of the stabilizing arms 21 with the bottoms of the slots 11 will prevent cocking or canting of the jaw elements, thereby assuring firm clamping of the parts over the entire usable surfaces 29 of the jaws.

Although a threaded connection between the members 1 and 8 has been shown in the drawings, it will be understood that the important consideration is that the support member 1 and the body 6 are relatively axially movable. Such relative movement may be effected by the threaded arrangement shown or, alternatively, by providing a sliding fit between the parts 1 and 8 and reciprocating the member 1 by hydraulic, pneumatic, or other means.

The embodiment of the invention disclosed in FIGURE 5 is similar in many respects to the previously described embodiment, but differs from the latter primarily in that the modified embodiment is adapted to support a workpiece for rotation in a nonrotatable lathe or other chuck. In the modified embodiment, the support member 1a terminates at its rear end in the threaded shank portion 2a and is keyed or otherwise slideably, but nonrotatably mounted on a spindle 32 in which there is an axially extending keyway or slot 33 that is adapted to receive the key or pin (not shown). A mounting member 8a has an axially threaded bore 12a that is threaded on the shank 5a of the support member in the same manner and for the same purpose described earlier. The mounting member 8a also includes inclined slots 11a in which the rear ends of the stabilizing arm members 21 are accommodated.

Mounting means 4a is provided for mounting the apparatus in a nonrotatable chuck and comprises a tapered shank member 34 terminating at one end in a skirt 35 within which the mounting member 8a is rotatably received. Supported on the outer periphery of the mounting member 8a is a bearing race 36 and supported on the inner surface of the skirt 35 in confronting relation to the race 36 are roller bearings 37. Radially inwardly of the skirt 35 is a hub 38 through which extends the spindle 32, the latter being journaled in the hub 38 by bearings 39. The opposite end of the shank 34 is provided with bearings 40 which journal as extension 41 of the spindle 32.

In the modified embodiment, a cylindrical body member 6a is fixed to the mounting member 8a by means of screws or the like 42. Preferably, the screws 42 also secure to the body member a knurled ring 43 by means of which the body may be rotated.

Releasable latch means 44 is provided to enable and disable relative rotation between the support member 1a and the body member 6a and comprises a rod 45 reciprocably mounted in a radially extending bore 46 formed in the skirt 35. The rod 45 has a head 47 against which one end of a compression spring 48 seats, the opposite end of the spring seating against the surface of the skirt 35 so as constantly to exert a force on the rod tending to urge it radially outwardly. Outward movement of the latch rod is limited by a pin 49 that is received in a groove 50 in the rod 45. The radially inner end of the rod 45 may be received in a hole 51 formed in the spindle extension 41 so as releasably to lock the mounting member 4a to the spindle 32.

When the parts of the apparatus are in the positions shown in FIGURE 5, the body 6a, the mounting member 8a, the support member 1a, and the spindle 32 rotate in unison relatively to the mounting member 4a which may be fixed in a nonrotatable chuck. When it is desired to effect radial movement of the jaw elements 13, the latch rod 45 may be projected radially inwardly so as to enter the hole 51 and prevent relative rotation between the spindle 32 and the member 4a. Manual rotation of the body 6a then will cause corresponding rotation of the mounting member 8a so as to effect axial movement of the mounting member 8a relative to the support member 1a. Upon relative axial movement of the parts 1a and 8a, the jaw elements 13 will be moved radially inwardly or outwardly in the manner described previously, depending upon the direction of relative axial movement of the members 1a and 6a. When the jaw elements 13 have been adjusted as desired, the latch 44 may be released, whereupon the spring 48 will restore the rod 45 to its outwardly projected or inoperative position, thereupon freeing the spindle 32 and permitting the joint rotation of the parts 6a, 8a, and 1a.

Figure 7:
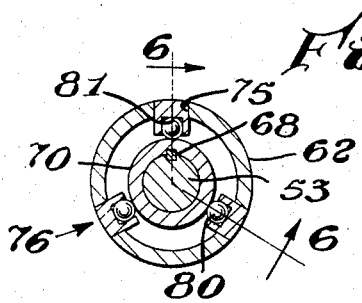
FIGURE 7 is a transverse sectional view taken on the line 7—7 of FIGURE 6.

The embodiment of the invention disclosed in FIGURES 6 and 7 comprises an expansible chuck for use in gripping the inner surface of a tubular workpiece. The apparatus comprises an elongated support 52 having a smooth shank 53 terminating at one end in an enlargement 54 that is fixed in a mounting member 55 having a rearwardly extending, threaded skirt portion 56 which may be threaded onto the correspondingly threaded shaft 57 of a lathe or similar machine 58. The mounting member 55 also includes a forwardly projecting skirt portion 59 within which is rotatably accommodated an annular flange 60 formed at one end of a generally cylindrical body member 61 having an elongated, tubular portion 62 which is interiorly threaded as at 63 adjacent its free or outer end. A knurled operating ring 64 is fixed to the body 61 by suitable means such as screws 65. The body 61 is maintained in assembled relation with the mounting member 55 by suitable means such as a snap ring 66.

An annular thrust member 67 is keyed as at 68 to the support member 52 and comprises two axially spaced inclined or tapering surfaces 69 and 70, the inclination of the two surfaces being uniform. The free or forward end of the thrust member 67 is threaded as at 71 and is in threaded engagement with the body member 61. Preferably, the forward end of the thrust member is counterbored as at 72 and in which is accommodated a snap ring or other suitable device 73 to restrain axial movement of the thrust member on the support member. If desired, an end cap 74 may be secured to the forward end of the body to cover the counterbore 72.

The tubular portion 62 of the body member is provided with three, uniformly annularly spaced, axially extending slots 75 and in each of which is slideably received an independent jaw element 76. Each jaw element has an outer work engaging surface 77 which parallels the axis of the support member 52 and an inner, inclined surface 78, the inclination of which corresponds to the inclination of the surfaces 69 and 70. At the rear end of each jaw element is a pocket 79 in which is accommodated a thrust member or ball 80. At the forward end of each jaw member is another pocket 81 in which is accommodated a similar ball 82. The axial length of each jaw element is such that the balls 80 engage the surface 69 of the thrust member and the balls 82 engage the surface 70.

The jaw elements 76 are radially reciprocable in the body member 61, and are maintained in assembled relation therewith by means of a flat compression spring 83 which surrounds the body member and preferably is accommodated in a recess formed in each jaw.

In the operation of the apparatus shown in FIGURES 6 and 7, rotation of the ring member 64 will cause corresponding rotation of the body member 61 relative to the support member 52. Rotation of the body 61 in one direction will effect axial movement of the thrust member 67 to the left, as viewed in FIGURE 6, and cause the surfaces 69 and 70 of the thrust member 67 to exert a force on the balls 80 and 82 which, in turn, will transmit the force to the jaw elements 76 and expand them radially outwardly. Rotation of the body member 61 in the opposite direction will move the thrust member in the opposite direction and enable the spring 83 to move the jaws radially inwardly.

Figure 8:
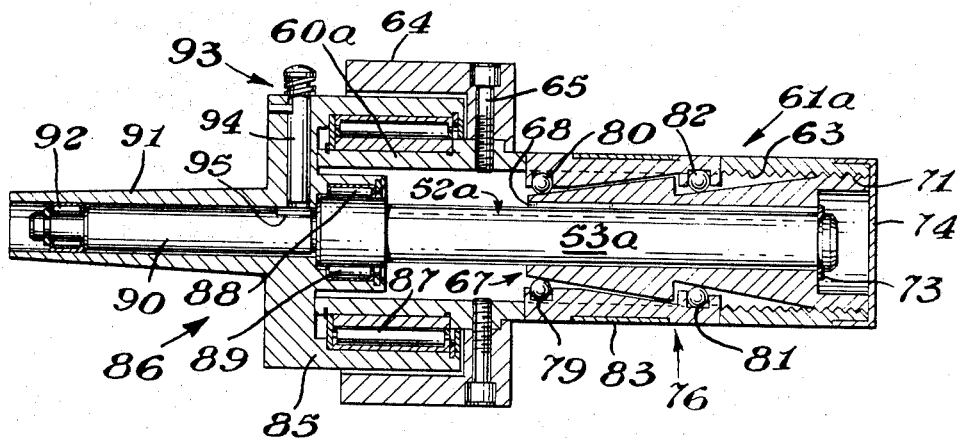
FIGURE 8 is a view similar to FIGURE 6, but illustrating a modified form of the expansible chuck construction.

In the embodiment of the invention shown in FIGURE 8, the body member 61a is similar to that described earlier, but includes an elongated extension 60a which is rotatably journaled in a skirt 85 of a mounting member 86 by means of a bearing assembly 87. The support member 52a includes the shank 53a similar to a shank 53 but which is journaled in a hub 88 of the member 86 by means of bearings 89. An extension 90 of the support member 52a extends into a hollow, tapered stem 91 of the member 86 and is journaled therein by means of bearings 92. A latch 93 similar to the latch 44 previously described includes a rod 94 which extends through the skirt 85 for reception in a hole 95 in the shaft extension 90.

In the operation of the apparatus shown in FIGURE 8, the mounting member 86 may be mounted in a non-rotatable chuck of a machine tool and, when the parts are in the positions shown, rotation of the body member 61a will cause corresponding rotation of the support member 52a. Upon engagement of the latch rod 94 with the extension 90, however, rotation of the support member 52a will be prevented, thereby enabling rotation of the body member to effect axial movement of the thrust member 67 relative to the body and support members so as to effect radial movement of the jaws 76 in the same manner previously described.

The disclosed embodiments are representative of presently preferred forms of the invention, but are intended to be illustrative rather than definitive thereof. The invention is defined in the claims.

I claim:

1. A chuck construction comprising a support member; means mounting said support member for rotation; releasable latch means reacting between said mounting means and said support member for disabling rotation of the latter; a generally cylindrical body member rotatably mounted on said support member, said body member having a plurality of uniformly angularly spaced, axially extending slots therein; axially elongated, annular thrust means mounted on said support member inwardly of said body member for movement axially of said support member and having a plurality of axially spaced, inclined surfaces thereon; a plurality of independent jaw elements mounted one in each of said slots; antifriction thrust transmitting means interposed between and engaging said jaw elements and said thrust means for moving said jaw elements radially outwardly in response to relative axial movement in one direction of said thrust means and said support member; and resilient means engaging each of said jaw elements and exerting a force thereon tending to urge said jaw elements radially inwardly.

2. The construction set forth in claim 1 wherein said resilient means comprises a coil spring surrounding said jaw elements.

3. The construction set forth in claim 1 including means at one end of said support member for mounting the latter and said body member for conjoint rotation.

4. The construction set forth in claim 1 wherein said body member is in threaded engagement with said thrust means.

5. A chuck construction comprising a support member; means mounting said support member for rotation; axially elongated thrust means mounted on said support member for movements axially thereof and having axially spaced, conical thrust surfaces thereon; a generally cylindrical body member mounted on said thrust means in threaded engagement therewith for rotation and axial movement relative thereto, said body member having a plurality of uniformly angularly spaced, axially extending slots therein; a plurality of independent jaw elements mounted one in each of said slots; antifriction thrust transmitting means interposed between and engaging said jaw elements and each of said thrust surfaces for moving said jaws radially outwardly in response to relative axial movement in one direction of said body member and said thrust means; and resilient means engaging each of said jaw elements and exerting a force thereon tending to urge said jaw elements radially inwardly.

References Cited

UNITED STATES PATENTS

| 1,777,316 | 10/1930 | Kuffner. | |
|-----------|---------|----------|---|
| 2,429,617 | 10/1947 | Gustafson | 279—52 |
| 2,465,836 | 3/1949 | Benjamin | 279—49 |
| 2,829,900 | 4/1958 | Davis | 279—56 |
| 2,881,006 | 4/1959 | Amiet | 279—53 |
| 2,935,329 | 5/1960 | Hessler | 279—46 |
| 3,070,380 | 12/1962 | Holmberg | 279—51 |
| 2,544,633 | 3/1951 | Count | 279—2 X |
| 2,690,914 | 10/1954 | Bryant et al. | 279—2 |
| 2,843,388 | 7/1958 | Butler | 279—66 |

FOREIGN PATENTS

| 105,566 | 12/1917 | Great Britain. |
| 709,269 | 5/1965 | Canada. |

ROBERT C. RIORDON, Primary Examiner